United States Patent
Bliss (10) Patent No.: US 8,434,082 B2
(45) Date of Patent: Apr. 30, 2013

(54) EFFICIENT TICKET LOCK SYNCHRONIZATION IMPLEMENTATION USING EARLY WAKEUP IN THE PRESENCE OF OVERSUBSCRIPTION

(75) Inventor: Brian E. Bliss, Tolono, IL (US)

(73) Assignee: Intel Corporation, Santa Clara, CA (US)

( * ) Notice: Subject to any disclaimer, the term of this patent is extended or adjusted under 35 U.S.C. 154(b) by 1651 days.

(21) Appl. No.: 11/473,580

(22) Filed: Jun. 22, 2006

(65) Prior Publication Data

US 2007/0300226 A1 Dec. 27, 2007

(51) Int. Cl.
*G06F 9/46* (2006.01)
*G06F 9/455* (2006.01)

(52) U.S. Cl.
USPC ............... 718/100; 718/1; 718/102; 718/104; 718/108

(58) Field of Classification Search .................. 718/100, 718/101, 14, 107, 1, 102, 108, 104
See application file for complete search history.

(56) References Cited

U.S. PATENT DOCUMENTS

| | | | |
|---|---|---|---|
| 4,249,241 A | 2/1981 | Aberle et al. | |
| 4,791,554 A | 12/1988 | Hirota et al. | |
| 5,202,990 A | 4/1993 | Saikawa | |
| 5,414,839 A | 5/1995 | Joshi | |
| 5,682,530 A | 10/1997 | Shimamura | |
| 6,343,339 B1 | 1/2002 | Daynes | |
| 6,374,285 B1 * | 4/2002 | Scales et al. ................... | 718/104 |
| 6,593,940 B1 | 7/2003 | Petersen et al. | |
| 6,748,470 B2 | 6/2004 | Goldick | |
| 6,898,791 B1 | 5/2005 | Chandy et al. | |
| 6,910,211 B1 * | 6/2005 | Wilhelm, Jr. ................. | 718/104 |
| 6,976,107 B2 * | 12/2005 | Limoges et al. .............. | 710/220 |
| 7,234,143 B2 * | 6/2007 | Venkatasubramanian .... | 718/102 |
| 7,251,814 B2 * | 7/2007 | Armstrong et al. ........... | 718/104 |
| 2002/0107854 A1 * | 8/2002 | Hua et al. .......................... | 707/8 |
| 2003/0041090 A1 * | 2/2003 | Armstrong et al. ........... | 709/106 |
| 2003/0101300 A1 | 5/2003 | Goldick | |
| 2004/0068616 A1 * | 4/2004 | Tierney et al. ................ | 711/141 |
| 2005/0055593 A1 | 3/2005 | Shah et al. | |
| 2005/0081204 A1 * | 4/2005 | Schopp ......................... | 718/100 |
| 2007/0143766 A1 | 6/2007 | Farchi et al. | |
| 2007/0150904 A1 * | 6/2007 | Kim et al. ..................... | 719/318 |
| 2011/0047549 A1 * | 2/2011 | Rogers et al. ................. | 718/100 |

OTHER PUBLICATIONS

Culler et al. "Parallel Computer Architecture: A Hardware/Software Approach" (Book), 1999, pp. 346-348.*
Anderson, Thomas E., "The Performance of Spin Lock Alternatives for Shared-Memory Multiprocessors," IEEE Transactions on Parallel and Distributed Systems, vol. 1, No. 1, pp. 6-16, Jan. 1990.
Mellor-Crummey, J.M., et al., "Algorithms for Scalable Synchronization on Shared-Memory Multiprocessors,", pp. 1-41, Jan. 1991.
Office Action for U.S. Appl. No. 11/480,141 dated Dec. 23, 2010, 15 pages.

* cited by examiner

*Primary Examiner* — Emerson Puente
*Assistant Examiner* — Willy W Huaracha
(74) *Attorney, Agent, or Firm* — Blakely, Sokoloff, Taylor & Zafman LLP (57) ABSTRACT

A turn-oriented thread and/or process synchronization facility obtains a ticket value from a monotonically increasing ticket counter and waits until a memory location contains a value equal to the ticket value, yielding the processor between polls of the memory location only if a difference between the ticket value and the contents of the memory location exceeds a threshold value. Machine-readable media containing instructions to implement similar methods, and systems that can use the methods, are also described and claimed.

11 Claims, 6 Drawing Sheets

EFFICIENT TICKET LOCK SYNCHRONIZATION IMPLEMENTATION USING EARLY WAKEUP IN THE PRESENCE OF OVERSUBSCRIPTION

FIELD

The invention relates to synchronization in multithreaded applications. More specifically, the invention relates to an improved implementation to perform ticket lock synchronization.

BACKGROUND

Many contemporary data processing systems have adopted multiprocessing architectures in an attempt to improve performance. Various techniques have been used, from simply installing multiple central processing units ("CPUs") to building individual CPUs with multiple execution cores that still share some support circuitry. Combinations of these techniques have also been tried.

Unfortunately, system performance rarely scales linearly with the number of CPUs or execution cores available. Part of this is simply due to the inevitable overhead of synchronizing and coordinating the operations of multiple processors sharing resources like main memory and hardware peripherals. Coordination overhead may be relatively unaffected by the number of processors managed (i.e. it may represent a fixed cost). However, as the number of processors grows further, contention between multiple threads of execution (either actual threads, which share a memory space, or processes, which do not) for shared, single-access resources, can consume an increasing amount of processing power.

Inter-thread (inter-process) synchronization in multi-threaded programs is usually based on low-level functions supported by the hardware and called, aptly enough, synchronization primitives. One of the simplest primitives is called a test-and-set ("TAS") instruction. A TAS instruction can be encapsulated in a loop to form a simple test-and-set lock, which can protect a shared, single-access resource against multiple simultaneous attempts by different threads to change the state of the resource. However, simple test-and-set locks may not provide adequately sophisticated semantics for complex programs. For example, if many threads use such a mechanism to protect a highly-contended resource, scheduling and timing vagaries may result in predominantly (or only) one of the threads actually being allowed to use the resource for extended periods of time. Moreover, the memory traffic generated by simple test-and-set locks can impact the execution speed of the entire program. Synchronization facilities built on lower-level synchronization primitives, or on more complex intrinsic atomic operations that can be performed by a processor, can provide the sophisticated semantics a program may need, and efficient implementations of those synchronization facilities may permit a multithreaded program that uses them to operate faster.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Figure 1:
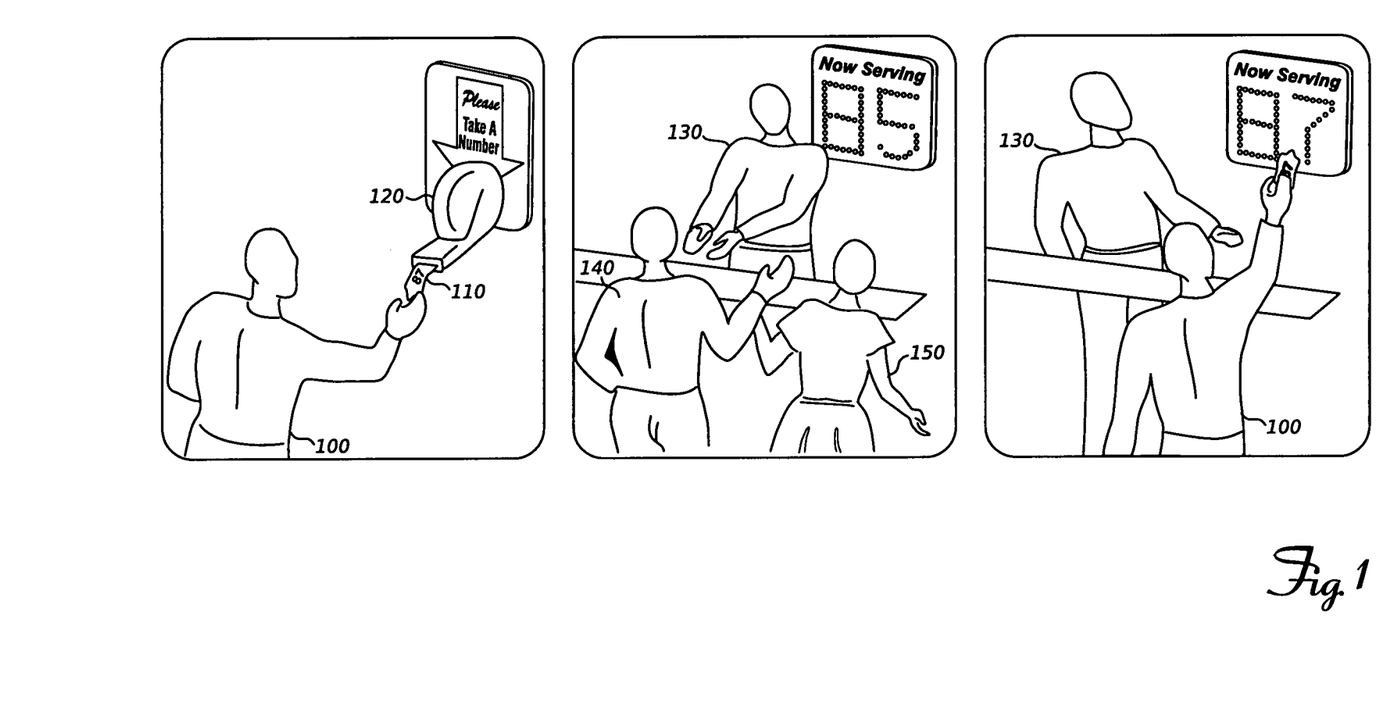
FIG. 1 shows a real-world analogue of a synchronization facility according to an embodiment of the invention.

Embodiments of the invention implement an efficient, turn-based synchronization facility for multithreaded and multi-process programs running on multiprocessor data processing systems. The facility can be intuitively understood as analogous to the "Take-A-Number" customer service systems often seen in busy retail stores. FIG. 1 shows how such a system works: a customer 100 entering the store takes a numbered ticket 110 from a dispenser 120. Then, the customer waits as a clerk 130 serves customers 140, 150 who arrived earlier and consequently hold lower-numbered tickets. Eventually, the clerk 130 calls the number on the ticket 110 customer 100 took when he arrived, and the customer is served. Differences between this real-world system and embodiments of the invention will be discussed below.

Listing 1 shows a basic pseudo-code implementation of a ticket-based, turn-oriented synchronization facility (a "ticket lock synchronization system") similar to the real-world Take-A-Number system.

```
 10 typedef struct TicketLock {
 20    int TicketCounter;
 30    int NowServing;
 40 } TicketLock;
 50 WaitInLine( TicketLock &l ) {
 60    int ticket = AtomicFetchAndIncrement( &l.TicketCounter );
 70    while (ticket > AtomicFetch( &l.NowServing ))
 80      yield( );
 90    /* done waiting, this thread holds the TicketLock */
100 }
110 Finished( TicketLock &l ) {
120    AtomicIncrement( &l.NowServing );
130 }
```

Listing 1

A thread or process that wishes to use a shared, single-access resource (analogous to the clerk in the real world) calls WaitInLine (line 50) to await its turn. WaitInLine obtains a ticket value from a counter by using AtomicFetchAndIncrement (line 60). AtomicFetchAndIncrement increments a variable (in this case, the instance variable TicketCounter) and returns the value of the variable (ticket lock implementations can use the variable's value either before or after incrementing). The word "Atomic" in the function name indicates that the fetch-and-increment operation must not be interrupted by some other thread's access of or operation on the variable. Some programmable processors provide a single instruction to perform the desired operation; others may require that the fetch-and-increment operations be protected by a lower-level synchronization primitive. Then, WaitInLine polls the NowServing variable (line 70) (reads of NowServing must also be atomic, or else protected with a synchronization primitive) until the variable matches the ticket value obtained earlier. At this point, the thread may safely access the shared resource because all other threads that are waiting for the resource hold different ticket values, all of which exceed the value of the NowServing variable.

Finally, when the thread is done using the resource, it calls Finished (line 110). This function uses AtomicIncrement to increment the NowServing variable (line 120). If another thread is waiting for the resource, it will discover that NowServing matches its ticket value and begin to use the resource.

The ticket-lock synchronization system described with reference to Listing 1 provides the desired semantics, but loses performance at least two points. Embodiments of the invention address these points to improve the efficiency of an implementation.

First, in the basic implementation, a waiting thread yields the remainder of its timeslice if it determines that the NowServing variable does not match its ticket value (Listing 1, line 80). Yielding the processor here frees processing cycles for use by other threads of execution, but may result in a context switch to another thread or process. Such context switches may be expensive: an operating system or thread management facility may have to load different virtual memory ("VM") translation tables, and processor caches that contain data relevant to the waiting thread may be flushed and loaded with data for other threads. When the waiting thread runs again, a second context switch occurs, the original VM translation tables are restored, and the processor cache may have to reload data and instructions for the waiting thread.

As an alternative to yielding, an implementation may continuously poll the NowServing variable throughout its timeslice in a busy-waiting loop. This avoids the two context switches described above, but wastes processing cycles and contributes to a second performance problem (described below).

Figure 2:
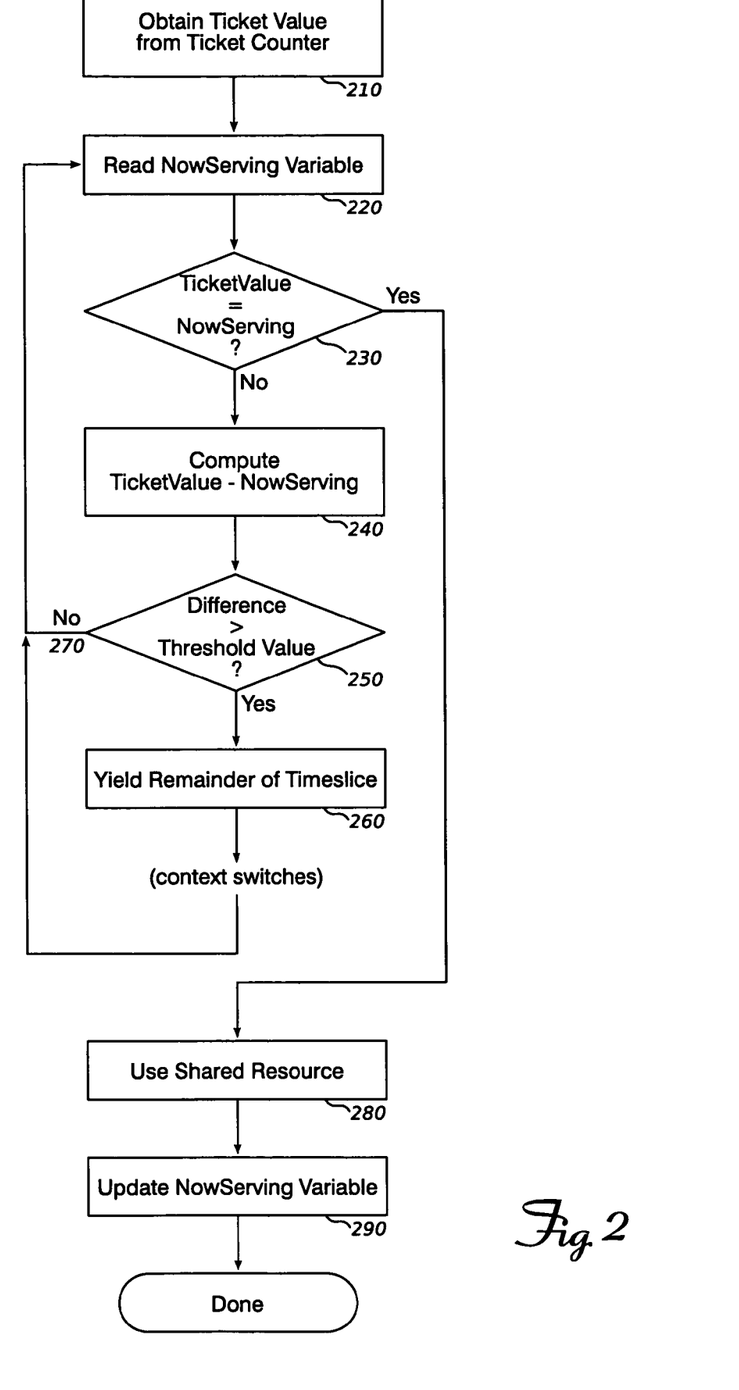
FIG. 2 is a flow chart detailing operations according to a first embodiment.

Consequently, according to an embodiment of the invention, a ticket-lock synchronization system can operate as described in the flow chart of FIG. 2. When a thread of execution wishes to use a shared, single-access resource protected by a ticket lock, it obtains a ticket value from a monotonically increasing ticket counter (210), as in the basic implementation. Ticket locks may also be implemented with monotonically decreasing counters; this is a straightforward implementation choice, and will not be further discussed.

Next, the value of the NowServing variable is read atomically (220) and, if the ticket value equals the NowServing variable (230), the thread may proceed to use the resource (280). Otherwise, a difference between the ticket value and the NowServing value is computed (240). This difference represents the number of other threads waiting to use the resource, that (due to the ticket lock's first-in, first-out semantics) will be permitted to use the resource before the current thread.

If the difference exceeds a threshold value (250), the ticket lock implementation yields the remainder of its timeslice (260). When the thread next runs, it will loop back to operation 220 and re-check the NowServing variable. If the difference is less than or equal to the threshold value (270), the thread loops back to operation 220 immediately, without yielding.

Finally, after using the resource, the thread updates the NowServing variable (290) so that the next waiting thread will be allowed to use the shared resource.

The effect of thread synchronization operations as described above is to yield-wait (conserving processing resources for other users) while there are more than a threshold number of threads waiting for the resource ahead of a particular thread, and to busy-wait (avoiding context-switch overhead) if fewer than the threshold number of threads are ahead in line. The threshold value can be seen as a "wakeup distance" that indicates how long before a thread's turn the thread should switch from yield-waiting (where it is mostly asleep) to busy-waiting (where it is mostly awake). Testing of this algorithm on a four-processor system with eight threads (i.e. twice as many threads as processors, or 2× oversubscription) competing for access to a resource protected by a ticket lock, using a threshold value of one (i.e. busy waiting only when a thread is the next thread to be allowed access) shows a ten-fold improvement over the basic algorithm presented in Listing 1.

If additional information about the thread scheduler and/or resource usage profile is available, the algorithm of FIG. 2 can be improved even more. First, the threshold value can be adjusted dynamically as the multithreaded program executes. For example, if a typical duration of a thread's usage of the shared resource is less than a timeslice period, the threshold value may be increased in recognition of the fact that busy-waiting for a larger number of earlier-queued threads is likely to be beneficial. (In other words, busy-waiting when there is little chance that the earlier-queued threads will finish using the resource before the current thread's timeslice expires is undesirable, but busy-waiting when there is a good chance that this thread will get access to the resource within its current timeslice, even if this occurs near the end of the timeslice, is favored.) On the other hand, if a thread is sharing a processor or CPU core with another thread that is in a critical section, busy-waiting can adversely impact system performance. In the worst case, a busy-waiting thread might squander the very processor cycles that another thread scheduled on the same processor needs to complete its use of the shared resource. Thus, if a thread is sharing a processor with another thread in a critical section, the threshold value may be decreased.

In the limit, decreasing the threshold value to zero is equivalent to always yielding while waiting for the NowServing variable to become equal to the ticket value obtained by the thread. If very little information about other threads is available beyond the fact that another thread sharing the same processor is also in the critical section protected by the ticket lock, it may be preferable to decrease the threshold value to zero. If additional information is available, then threshold values between zero and the "normal" value may be useful. For example, if the normal threshold is five, but one thread discovers that another thread sharing the same processor is three places ahead of it in line, the threshold value for the later thread may be reduced to two. This will cause the later thread to yield-wait until the earlier thread runs, then to spin-wait until its turn arrives.

A second area of improvement according to an embodiment of the invention lies in the arrangement and use of the NowServing indicator. Many contemporary programmable processors use a cache memory to improve processing speed: copies of data stored in a main memory may be held in a cache that can provide the data to the processor more quickly than the main memory can. Caches often accommodate blocks of data containing several adjacent bytes; these blocks are called "cache lines." For example, on a processor that uses a 32-bit word for most operations, a cache line may contain 512 bits (16 words, 64 bytes). Caches may be local to a single processor, or shared between several processor cores in a single package. Furthermore, a multiprocessor system may employ cache coherency logic to ensure that different processors do not cache separate (and possibly inconsistent) copies of data in a main memory location. Therefore, in a multiprocessor system with cache memory, having multiple threads examining (and possibly updating) a single memory location can constitute a memory bottleneck, as the various processors update the contents of the memory location and invalidate other processors' caches of the same location. Specifically, with reference to an embodiment of the invention, if several threads monitor and update the same NowServing indicator, cache contention can reduce the performance of the ticket-lock synchronization facility.

Figure 3:
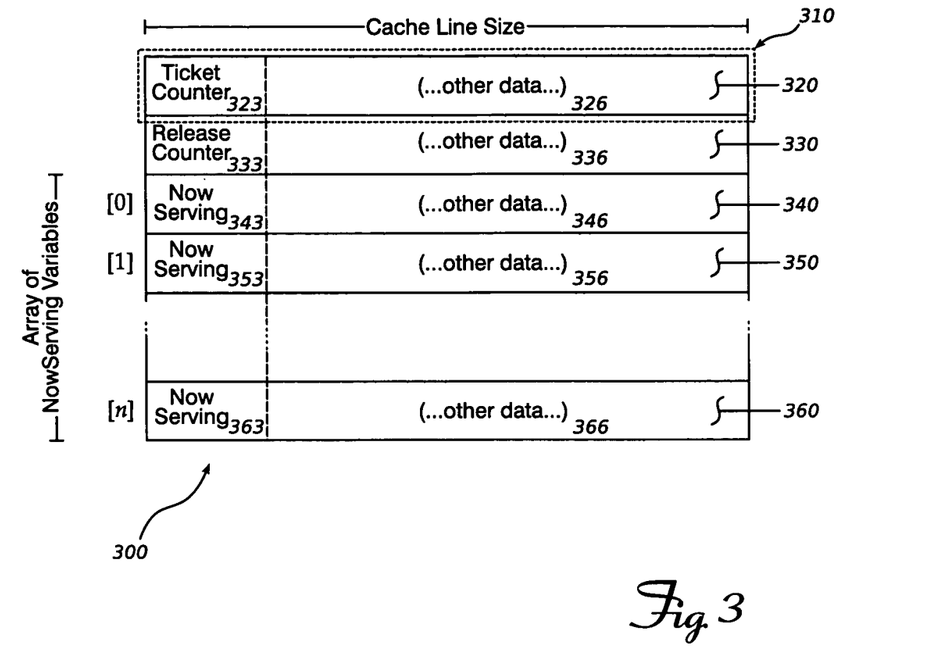
FIG. 3 shows a data structure that supports a second aspect of some embodiments.

FIG. 3 shows how an embodiment of the invention can arrange a data structure to support the ticket-lock functionality and reduce or eliminate cache contention. The data structure 300 includes several blocks of data bytes 310, each block to equal or exceed the size of a cache line for the processor. The first block 320 includes a counter variable 323; this variable's value is used as the monotonically increasing ticket counter. If a cache line is larger than the counter variable (as shown here), other data may be stored in bytes 326. For example, an implementation may store information to track an average delay between acquiring and releasing a ticket lock, for use in adjusting the threshold value (as described above). The second block 330 contains another counter variable 333, that is used to indicate which ticket value should be released. Other data may be stored in excess area 336.

After the ticket counter variable 323 and release counter 333 are a plurality of NowServing elements 340, 350 . . . 360 (in the simplest case, a ticket lock may be implemented with only one such element). Each NowServing element includes a variable 343, 353, 363 to hold a ticket value. Again, if a cache line is larger than the variable, other data may be stored in the following bytes 346, 356, 366. Note that that NowServing counter variables will be at least n bytes apart, where n is the size of a cache line. If the number of NowServing elements is sufficiently large, every thread waiting on the lock will be able to poll a separate memory location, and cache contention will be reduced. (The ticket lock will still function properly if some of the NowServing elements are polled by multiple threads.) Listing 2 shows pseudo-code for a ticket lock with a distributed polling area.

```
 10  typedef struct TicketLock {
 20      int TicketCounter;
 30      char pad1[sizeof(CacheLine)-sizeof(int)];
 40      int ReleaseCounter;
 50      char pad2[sizeof(CacheLine)-sizeof(int)];
 60      struct {
 70          int NowServing;
 80          char pad3[sizeof(CacheLine)-sizeof(int)];
 90      } Poll[nPolls];
100  } TicketLock;
110  WaitInLine( TicketLock &l ) {
120      int ticket = AtomicFetchAndIncrement( &l.TicketCounter );
130      while (ticket >
140          AtomicFetch( &l.Poll[ticket_value%nPolls].NowServing ))
150          yield( );
160      /* done waiting, this thread holds the TicketLock */
170  }
180  Finished( TicketLock &l ) {
190      int rel = ++l.ReleaseCounter;
200      AtomicStore( rel, &l.Poll[rel%nPolls].NowServing );
210  }
```

Listing 2

This listing shows the multiple-element polling array Poll[ ], but is otherwise similar to the basic ticket lock where a waiting thread always yields its timeslice if it is not yet its turn to take the lock. The Finished( ) function is slightly more complicated, as a thread leaving the critical section must determine which NowServing variable is being polled by the next thread in line. However, the corresponding advantage of this complexity is that one may expect the cache line invalidated by the AtomicStore at line 190 exists only in the cache of the processor next in line to enter the critical section, not all of the processors.

Early wakeup, as described in paragraphs [0018] through [0022] and FIG. 2, may be combined with the distributed polling data structure described above, to produce a preferred embodiment of the invention. The combination may be accomplished in a number of ways, two of which will be described here.

Figure 4:
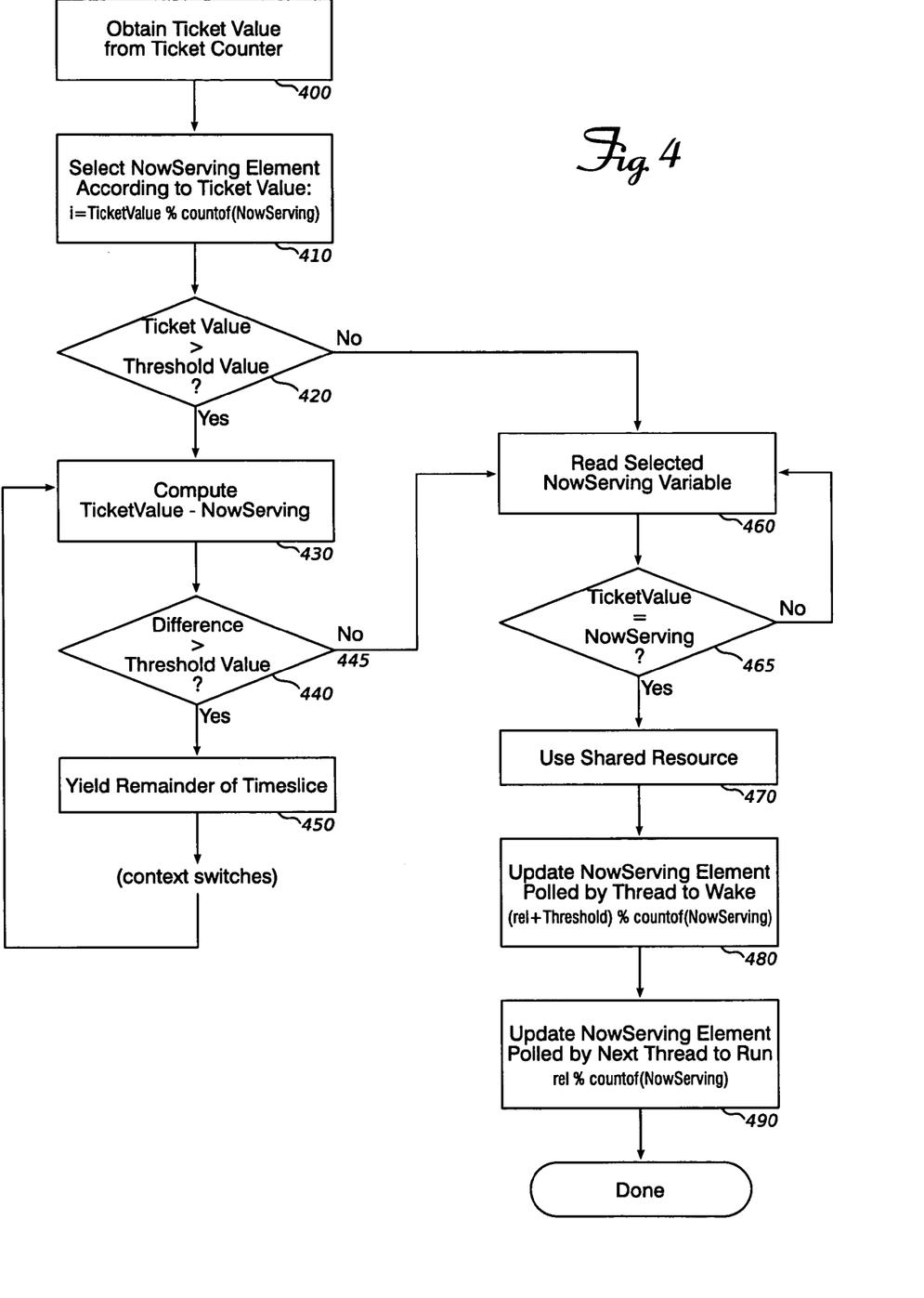
FIGS. 4 and 5 are flow charts detailing operations according to some embodiments.

FIG. 4 is a flow chart showing operations of a first of the two combination embodiments. When a thread of execution wishes to use a shared, single-access resource protected by a ticket lock, it obtains a ticket value from a global, atomically-accessible ticket counter (400). Next, the address (index) of a NowServing array element is computed based on the ticket value and the number of elements in the distributed polling data structure (410). If the ticket value is greater than or equal to the threshold value (420), then the thread yield-waits while the difference between the ticket value and the selected NowServing variable (430) is greater than the threshold value (440, 450).

When the difference between the ticket value and the selected NowServing variable becomes less than or equal to the threshold value (445), the thread busy-waits until the selected NowServing variable equals the ticket value (460, 465). Now, the thread is allowed to use the shared-access resource (470). When the access is completed, the thread updates two elements in the NowServing polling array. The first element is the one being polled by the thread that will be woken up to switch from yield-waiting to busy-waiting, at (rel+threshold)%nPoll (480). The second element is the one being polled by the thread that is currently busy-waiting (the next thread to acquire the ticket lock and enter the critical section), at rel%nPoll (490).

Note that in this implementation, the next thread to enter the critical section must not be released until after the write that allows the thread that is threshold places later in line to wake up from yield-waiting and switch to busy-waiting. Otherwise, thread i (i.e. the $i^{th}$ thread to enter the critical section) might release thread i+1, which releases i+2 and so on until i+threshold is released, all of which might happen before thread i writes to the location i+threshold is polling to determine when to switch from yield-waiting to busy-waiting. If thread i is then scheduled to run again, it would undo the release of i+threshold. Thread i+threshold would switch to busy-waiting, but would never actually be released to run. This is not just an unlikely timing problem: if the lock is coded with an incorrect update order, deadlock arises consistently at a threshold value of one, and unpredictably at higher threshold values. Listing 3 shows a pseudo-code implementation of the algorithm described with reference to FIG. 4. Note that lines 230 and 240 perform the updates shown in FIG. 4 at 480 and 490 in the correct order.

```
 10  typedef struct TicketLock {
 20      int TicketCounter;
 30      char pad1[sizeof(CacheLine)-sizeof(int)];
 40      int ReleaseCounter;
 50      char pad2[sizeof(CacheLine)-sizeof(int)];
 60      struct {
 70          int NowServing;
 80          char pad3[sizeof(CacheLine)-sizeof(int)];
 90      } Poll[nPolls];
100  } TicketLock;
110  WaitInLine( TicketLock &l ) {
120      int ticket = AtomicFetchAndIncrement( &l.TicketCounter );
```

```
130    if (ticket >= threshold) {
140        while (AtomicFetch( &l.Poll[ticket%nPolls].NowServing ) <
150             ticket - threshold)
160            yield( );
170    while (AtomicFetch( &l.Poll[ticket%nPolls].NowServing ) <
180         ticket)
190        /* do nothing -- busy waiting */;
200    /* done waiting, this thread holds the TicketLock */
210  }
220  Finished( TicketLock &l ) {
230    int rel = ++l.ReleaseCounter;
240    AtomicStore( rel, &l.Poll[(rel+
           threshold)%nPolls].NowServing );
250    AtomicStore( rel, &l.Poll[rel%nPolls].NowServing );
260  }
```

Listing 3

Figure 5:
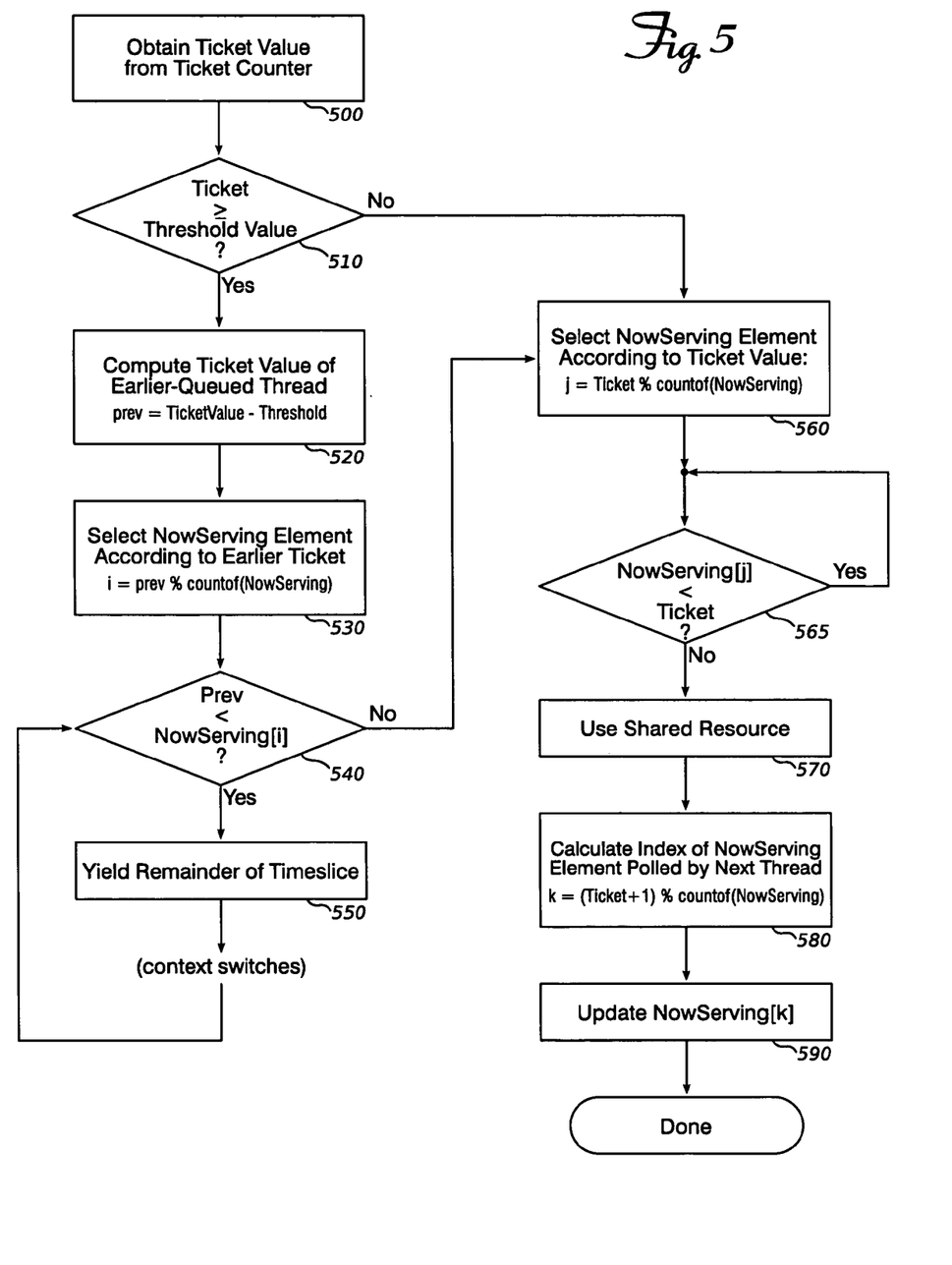

FIG. 5 is a flow chart showing operations of a second of the two combination embodiments described herein. When a thread of execution wishes to use a shared, single-access resource protected by a ticket lock, it obtains a ticket value from a global, atomically-accessible ticket counter (500). Then, if the ticket value is greater than or equal to than the threshold (510), it calculates the ticket value obtained by the thread that is threshold positions ahead of it in line to enter the critical section (520) and the address (index) of the element of the NowServing array that the earlier thread is polling (530). The thread polls this element (540) and yield-waits (550) until the earlier thread can enter the critical section. At this point, the thread calculates the address (index) of the element of the NowServing array that corresponds to its own ticket value (560) and polls that location in a busy-waiting loop (565) until its own turn to enter the critical section arrives. After using the shared resource (570), the thread calculates the address (index) of the element of the NowServing array that the next thread is polling (580) and updates that element (590). Listing 4 shows pseudo-code for this embodiment:

```
10   typedef struct TicketLock {
20     int TicketCounter;
30     char pad1[sizeof(CacheLine)-sizeof(int)];
40     int ReleaseCounter;
50     char pad2[sizeof(CacheLine)-sizeof(int)];
60     struct {
70       int NowServing;
80       char pad3[sizeof(CacheLine)-sizeof(int)];
90     } Poll[nPolls];
100  } TicketLock;
110  WaitInLine( TicketLock &l ) {
120    int ticket = AtomicFetchAndIncrement( &l.TicketCounter );
130    if (ticket >= threshold) {
140      int prev = ticket - threshold;
150      while (AtomicFetch(&l.Poll[prev%nPolls].NowServing) <
             prev)
160          yield( );
170    }
180    while (AtomicFetch( &l.Poll[ticket%nPolls].NowServing ) <
190         ticket)
200        /* do nothing -- busy waiting */;
210    /* done waiting, this thread holds the TicketLock */
220  }
230  Finished( TicketLock &l ) {
240    int rel = ++l.ReleaseCounter;
250    AtomicStore( rel, &l.Poll[rel%nPolls].NowServing );
260  }
```

Listing 4

Operations according to these embodiments distribute NowServing variable polling operations of different threads among the plurality of NowServing elements. Since each NowServing element is at least as large as a cache line, there will be little or no cache line contention between processors for NowServing variables until the number of threads waiting for the ticket lock exceeds the number of NowServing elements in the array. The array can be made arbitrarily large to avoid contention, or can be sized according to an engineering trade-off considering the cost of cache contention versus the cost of increased memory usage.

In the foregoing discussion, the "yield" function and descriptions of yielding a processor do not necessarily imply a heavyweight thread context switch. Some thread scheduling systems may permit a thread to give up the remainder of its timeslice only to another related thread that is sharing the same processor. Since threads typically share memory spaces, a lightweight yield function (hereinafter a "pause" function) may permit another related thread to execute on the processor without requiring an expensive switch of memory mapping configuration and cache flush.

In some embodiments, logic may be provided to track a correspondence between threads waiting on the ticket lock and the ticket values they obtained. This can permit the embodiment to recover from "lost" tickets: if a thread waiting for the lock abandons its ticket (intentionally or due to an asynchronous signal), the NowServing counter (or array of counters) would never be updated, and later threads waiting for the lock would hang. However, lost-ticket logic may be able to detect abandoned tickets and advance the appropriate NowServing counter to skip the lost ticket, thus permitting the program to continue.

Figure 6:
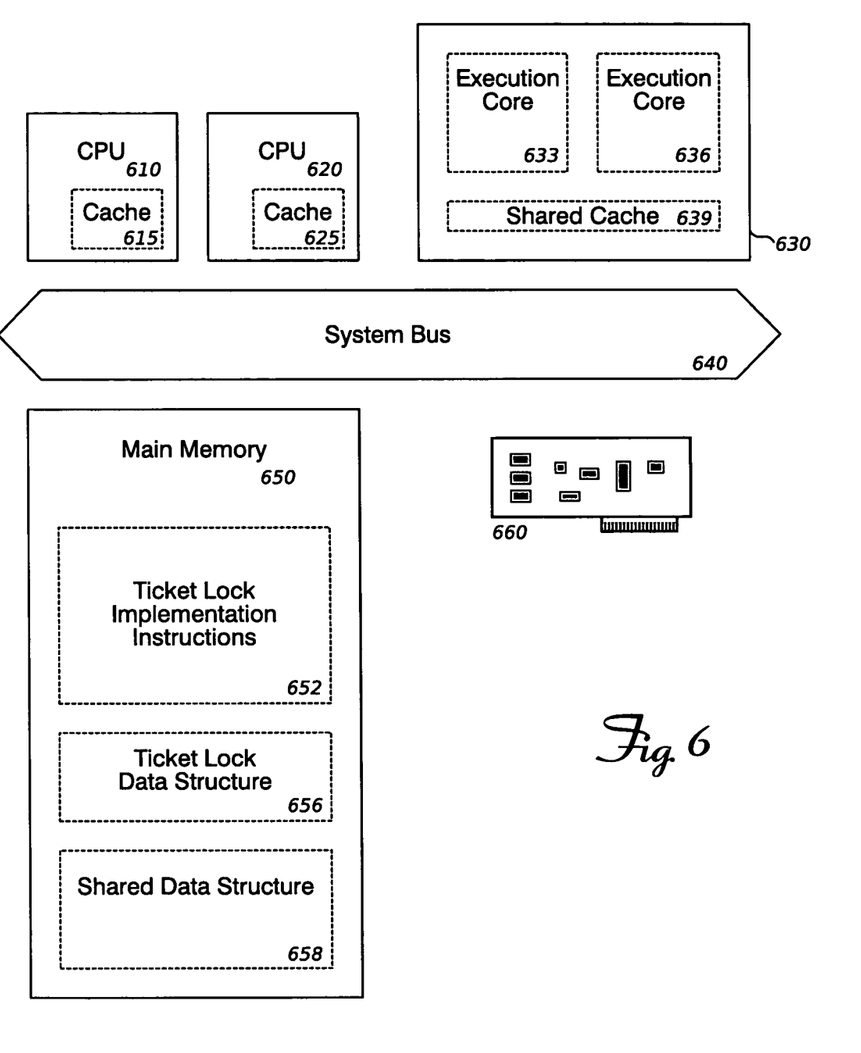
FIG. 6 shows components that may be present in a system that implements an embodiment.

FIG. 6 shows some of the components of a system that implements an efficient ticket-lock synchronization facility. Such a system may be equipped with multiple central processing units ("CPUs") 610 and 620, each with its own cache (615 and 625, respectively); or with a single CPU 630 that contains multiple execution cores 633 and 636 and a shared cache 639. Systems may contain more CPUs than shown here, although it is uncommon for a general-purpose system to mix different types of CPU.

The CPUs and/or execution cores can communicate with other system elements over a system bus 640. One such element is main memory 650, which may contain instructions to implement the ticket lock facility 652, a data structure 656 instantiating an actual ticket lock, and a shared data structure 658 that is the shared, single-access resource protected by the ticket lock. Systems may also contain hardware resources as indicated by "plug-in" card 660, which may be another shared, single-access resource protected by a ticket lock.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROMs), Read-Only Memory (ROMs), Random Access Memory (RAM), Erasable Programmable Read-Only Memory (EPROM), and a transmission over the Internet. The instructions stored on the medium may be in a human-readable source code format, suitable for distribution and compilation for use on an arbitrary multiprocessor system. Alternatively, the instructions may be pre-compiled and distributed as a static or shared library.

The applications of the present invention have been described largely by reference to specific examples and in terms of particular allocations of functionality to certain hardware and/or software components. However, those of skill in the art will recognize that an efficient, turn-oriented synchronization facility can also be implemented by software and hardware that distribute the functions of embodiments of this invention differently than herein described. Such variations and implementations are understood to be captured according to the following claims.

I claim:

1. A method comprising:
obtaining a ticket value for a first thread among a plurality of threads from a monotonically increasing ticket counter;
selecting a first memory location based on the ticket value and the number of memory locations in a distributed polling data structure;
computing a difference between the ticket value and a value from the first memory location, wherein the difference represents a number of other threads among the plurality of threads waiting for access to a shared single-access resource in contention among the plurality of threads which is controlled by a processor;
yielding a remaining portion of a time slice on the processor which is allocated to the first thread, to one of the other threads, when the difference exceeds a threshold value;
polling the first memory location without yielding the remaining portion of the time slice on the processor, until the first memory location contains a value equal to the ticket value when the difference does not exceed the threshold value, wherein the ticket value is stored in a second memory location, and wherein the first memory location and the second memory location are n bytes apart, where n is equal to or exceeds a size of a cache line of the processor;
acquiring the shared single-access resource for the first thread when the value of the first memory location is equal the thread's ticket value;
releasing the shared single-access resource when the first thread has completed access;
updating a memory location being polled by a next thread that will be woken up to switch from yield-waiting to busy-waiting; and
updating a memory location being polled by a next thread that is currently busy-waiting.

2. The method of claim 1, further comprising: decreasing the threshold value when a thread in a critical section is sharing the processor.

3. The method of claim 2 wherein decreasing the threshold comprises: determining a number of positions by which a current thread trails the thread in the critical section; and decreasing the threshold value by the number of positions.

4. The method of claim 1 further comprising: updating another counter variable that is used to indicate which ticket value should be released, to release a next waiting thread.

5. The method of claim 1, wherein obtaining the ticket value for the first thread comprises calling a WaitInLine operation which obtains the ticket value from a counter by using a fetch-and-increment operation which cannot be interrupted by some other thread.

6. The method of claim 1 wherein an address (index) of a NowServing array element is computed based on the ticket value.

7. A non-transitory computer-readable medium containing instructions to cause a programmable processor to perform operations comprising:
obtaining a ticket value for a first thread among a plurality of threads from a monotonically increasing ticket counter;
selecting a first memory location based on the ticket value and the number of memory locations in a distributed polling data structure;
computing a difference between the ticket value and a value from the first memory location, wherein the difference represents a number of other threads among the plurality of threads waiting for access to a shared single-access resource in contention among the plurality of threads which is controlled by the programmable processor;
yielding a remaining portion of a time slice on the programmable processor which is allocated to the first thread, to one of the other threads, when the difference exceeds a threshold value;
polling the first memory location without yielding the remaining portion of the time slice on the programmable processor, until the first memory location contains a value equal to the ticket value when the difference does not exceed the threshold value, wherein the ticket value is stored in a second memory location, and wherein the first memory location and the second memory location are n bytes apart, where n is equal to or exceeds a size of a cache line of the programmable processor;
acquiring the shared single-access resource for the first thread when the value of the first memory location is equal the thread's ticket value;
releasing the shared single-access resource when the first thread has completed access;
updating a memory location being polled by a next thread that will be woken up to switch from yield-waiting to busy-waiting; and
updating a memory location being polled by a next thread that is currently busy-waiting.

8. The non-transitory computer-readable medium of claim 7, containing additional instructions to cause the programmable processor to perform operations comprising: decreasing the ticket value when a thread in a critical section is sharing the programmable processor.

9. The non-transitory computer-readable medium of claim 7 wherein obtaining the ticket value for the first thread comprises calling a WaitInLine operation which obtains the ticket value from a counter by using a fetch-and-increment operation which cannot be interrupted by some other thread.

10. The non-transitory computer-readable medium of claim 7 wherein the memory location is one of a plurality of polling locations in an array, and wherein the polling location is a first polling location, containing additional instructions to cause the programmable processor to perform operations comprising: calculating a second ticket value, the second ticket value to be a ticket value obtained by a different thread among the plurality of threads; computing a second polling location from the second ticket value; and examining the second polling location in a yield-waiting loop until a value in the second polling location equals the second ticket value.

11. The non-transitory computer-readable medium of claim 7, containing additional instructions to cause the programmable processor to perform operations comprising: signaling the first thread after the value from the memory location equals the ticket value.

* * * * *